(12) United States Patent
Zhu et al.

(10) Patent No.: US 12,014,134 B2
(45) Date of Patent: Jun. 18, 2024

(54) DOCUMENT PROCESSING METHOD AND APPARATUS, READABLE MEDIUM AND ELECTRONIC DEVICE

(71) Applicant: Beijing Bytedance Network Technology Co., Ltd., Beijing (CN)

(72) Inventors: Yifan Zhu, Beijing (CN); Jiamin Zhang, Beijing (CN); Gongwei Xiao, Beijing (CN); Huapeng Yang, Beijing (CN); Weiwei Zhang, Beijing (CN); Yiyue Tao, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/323,549

(22) Filed: May 25, 2023

(65) Prior Publication Data

US 2023/0297769 A1    Sep. 21, 2023

Related U.S. Application Data

(63) Continuation of application No. PCT/CN2021/127948, filed on Nov. 1, 2021.

(30) Foreign Application Priority Data

Nov. 27, 2020    (CN) .......................... 202011359667.2

(51) Int. Cl.
*G06F 40/166*    (2020.01)
*G06F 3/0481*    (2022.01)
*G06F 3/0484*    (2022.01)

(52) U.S. Cl.
CPC .......... *G06F 40/166* (2020.01); *G06F 3/0481* (2013.01); *G06F 3/0484* (2013.01)

(58) Field of Classification Search
CPC ..... G06F 40/166; G06F 3/0481; G06F 3/0484
See application file for complete search history.

(56) References Cited

U.S. PATENT DOCUMENTS 10,467,344 B1 *  11/2019  Jade .................. G06F 40/205
2006/0015811 A1   1/2006  Tanaka et al.
(Continued)

FOREIGN PATENT DOCUMENTS

CN    104504131 A    4/2015
CN    108304361 A    7/2018
(Continued)

OTHER PUBLICATIONS

China National Intellectual Property Administration, Notice of Allowance Issued in Application No. 202011359667.2, dated Aug. 2, 2023, 4 pages.

*Primary Examiner* — William L Bashore
*Assistant Examiner* — Gregory A Distefano
(74) *Attorney, Agent, or Firm* — Alleman Hall & Tuttle LLP

(57) ABSTRACT

The present disclosure relates to document processing method and apparatus, readable medium and electronic device. The present disclosure enables: receiving changed target document content, and comment information corresponding to the target document content after position migration, the comment information including comment content and position information of the commented text after position migration; wherein, parent node of each text node in the target document content has its own identity identification, and each text node in the target document content has a node sequence number, the node sequence number characterizing the order of the text node among its sibling text nodes; and displaying the changed target document (Continued)

content and the comment information corresponding to the target document content after position migration.

9 Claims, 7 Drawing Sheets

(56) References Cited

U.S. PATENT DOCUMENTS

| | | | |
|---|---|---|---|
| 2006/0041579 A1* | 2/2006 | Miyashita | G06F 40/166 707/999.102 |
| 2010/0011282 A1* | 1/2010 | Dollard | G06F 40/169 715/810 |
| 2014/0032633 A1 | 1/2014 | Kleppner | |
| 2014/0033013 A1 | 1/2014 | Shaver | |
| 2014/0115436 A1 | 4/2014 | Beaver et al. | |
| 2014/0115443 A1* | 4/2014 | Shwartz | G06F 40/166 715/234 |
| 2014/0280336 A1 | 9/2014 | Glover | |
| 2015/0347128 A1 | 12/2015 | Frenkiel et al. | |
| 2016/0155091 A1* | 6/2016 | Arndorfer | G06Q 10/101 705/300 |
| 2017/0220546 A1* | 8/2017 | Codrington | G06F 16/2282 |
| 2021/0027007 A1 | 1/2021 | Peng | |
| 2021/0081605 A1* | 3/2021 | Smith | G06F 40/197 |

FOREIGN PATENT DOCUMENTS

| | | |
|---|---|---|
| CN | 108491468 A | 9/2018 |
| CN | 108595646 A | 9/2018 |
| CN | 108647025 A | 10/2018 |
| CN | 110609980 A | 12/2019 |
| CN | 111753505 A | 10/2020 |
| CN | 112328927 A | 2/2021 |
| EP | 0633539 A2 | 1/1995 |
| JP | 2009151727 A | 7/2009 |

\* cited by examiner

DOCUMENT PROCESSING METHOD AND APPARATUS, READABLE MEDIUM AND ELECTRONIC DEVICE

CROSS-REFERENCE TO RELATED APPLICATIONS

The present application is a continuation of PCT International Application No. PCT/CN2021/127948 filed on Nov. 1, 2021, which is based on and claims priority to the Chinese Patent Application number 202011359667.2, filed to the China National Intellectual Property Administration on Nov. 27, 2020, the disclosure of both of which are incorporated by reference herein in its entirety.

TECHNICAL FIELD

The present disclosure relates to the field of computer, and in particular, to document processing method and apparatus, readable medium and electronic device.

BACKGROUND

At present, comments on part of the text in a document can only be guaranteed to correspond to the text content if there is no change in the content of the document; any change in the content of the document may cause the correspondence between comments and the text content to be inconsistent. For example, it may cause the position of the text content corresponding to a comment to be invalid, so that the comment cannot be displayed; or even if a position can be successfully located according to the position of the text content corresponding to the comment, the text of the position may not be the text corresponding to the comment, that is, there is a situation that the comment does not correspond to the commented text at all. For example, if the text in the first paragraph in a document is deleted, all comments previously in the first paragraph will appear directly on the previous second paragraph accordingly in case that the positioning is still valid.

SUMMARY

This Summary is provided to introduce concepts in a simplified form that are described in detail in the following Detailed Description section. This Summary section is not intended to identify key features or essential features of the claimed technical solution, nor is it intended to be used to limit the scope of the claimed technical solution.

In a first aspect, the present disclosure provides a document processing method, the method comprising:
  receiving changed target document content sent by a server-side, and comment information corresponding to the target document content after position migration, the comment information including comment content and position information of the commented text after position migration; wherein, parent node of each text node in the target document content has its own identity identification, and each of the text nodes in the target document content has a node sequence number, which characterizes the order of the text node among its sibling text nodes; and
  displaying the changed target document content and the comment information corresponding to the target document content after position migration.

In a second aspect, the present disclosure provides a document processing method, the method comprising:
  determining change information of the target document content in response to a change in target document content, wherein parent node of each text node in the target document content has its own identity identification, and each of the text nodes in the target document content has a node sequence number, which characterizes the order of the text node among its sibling text nodes;
  determining whether comment information corresponding to the target document content needs to perform position migration according to the change information of the target document content, the comment information including comment content and position information of the commented text; and
  performing position migration to the comment information according to the change information, to obtain comment information after position migration, if the comment information needs to perform position migration, the comment information after position migration including the comment content and position information of the commented text after position migration.

In a third aspect, the present disclosure provides a document processing apparatus, the apparatus comprising:
  a receiving module configured to receive changed target document content sent by a server-side, and comment information corresponding to the target document content after position migration, the comment information including comment content and position information of the commented text after position migration; wherein, parent node of each text node in the target document content has its own identity identification, and each of the text nodes in the target document content has a node sequence number, which characterizes the order of the text node among its sibling text nodes; and
  a display module configured to display the changed target document content and the comment information corresponding to the target document content after position migration.

In a fourth aspect, the present disclosure provides a document processing apparatus, the apparatus comprising:
  a determination module configured to determine change information of target document content in response to a change in the target document content, wherein parent node of each text node in the target document content has its own identity identification, and each of the text nodes in the target document content has a node sequence number, which characterizes the order of the text node among its sibling text nodes;
  a judgement module configured to determine whether comment information corresponding to the target document content needs to perform position migration according to the change information of the target document content, the comment information including comment content and position information of the commented text; and
  a migration module configured to perform position migration to the comment information according to the change information, to obtain comment information after position migration, if the comment information needs to perform position migration, the comment information after position migration including the comment content and position information of the commented text after position migration.

In a fifth aspect, the present disclosure provides a computer-readable medium having computer programs stored thereon, which, when executed by a processing apparatus, implement the steps of the method described in the first aspect.

In a sixth aspect, the present disclosure provides an electronic device, comprising:
- a storage apparatus having computer programs stored thereon;
- a processing apparatus configured to execute the computer programs in the storage apparatus to implement the steps of the method described in the first aspect.

In a seventh aspect, the present disclosure provides a computer-readable medium having computer programs stored thereon, which, when executed by a processing apparatus, implement the steps of the method described in the second aspect.

In an eighth aspect, the present disclosure provides an electronic device, characterized in that it comprises:
- a storage apparatus having computer programs stored thereon;
- a processing apparatus configured to execute the computer programs in the storage apparatus to implement the steps of the method described in the second aspect.

Other features and advantages of the present disclosure will be described in detail in the following Detailed Description section.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numbers refer to the same or similar elements. It should be understood that the drawings are schematic and that the originals and elements are not necessarily drawn to scale. In the drawings.

DETAILED DESCRIPTION

Figure 1:
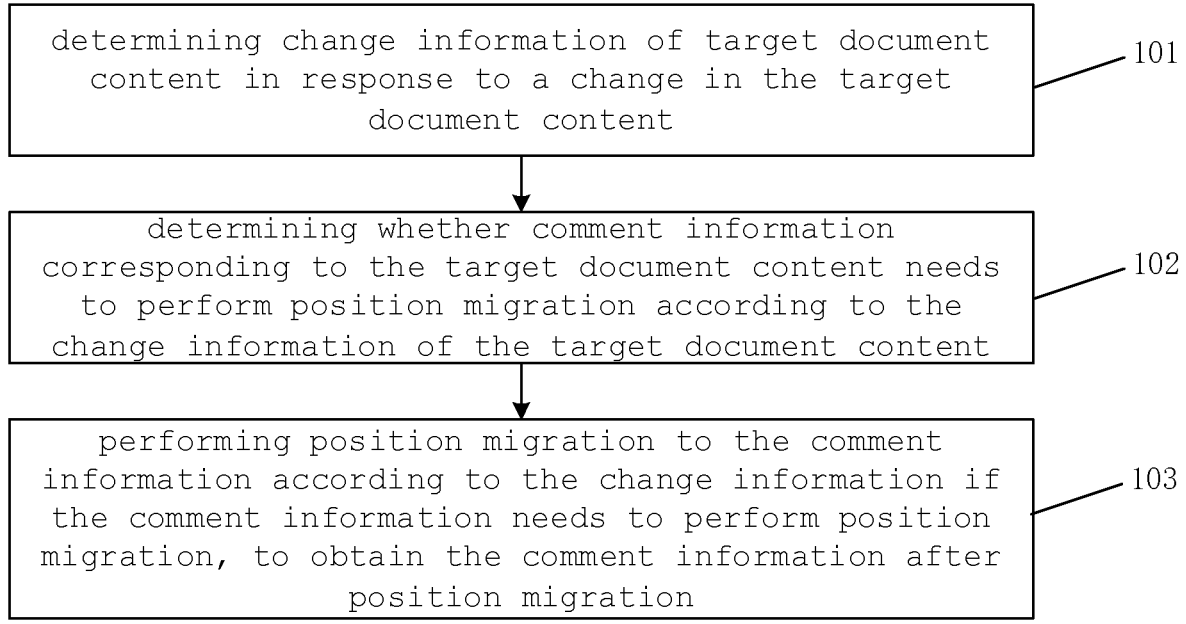
FIG. 1 is a flow chart of a document processing method according to an exemplary embodiment of the present disclosure.

Hereinafter, embodiments of the present disclosure will be described in more detail with reference to the accompanying drawings. Although some embodiments of the present disclosure are shown in the drawings, it should be understood that the present disclosure can be implemented in many different forms, which should not be construed as being limited to embodiments set forth herein, rather, these embodiments are provided for a more thorough and complete understanding of the present disclosure. It should be understood that the drawings and embodiments of the present disclosure should be explained as merely illustrative, and not as a limitation to the protection scope of the present disclosure.

It should be understood that various steps recited in the method embodiments of the present disclosure may be executed in a different order, and/or executed in parallel. In addition, the method implementations may include additional steps and/or omit to perform illustrated steps. The scope of the present disclosure is not limited in this respect.

The term "including" and its variants as used herein are open includes, that is, "including but not limited to". The term "based on" means "based at least in part on." The term "one embodiment" means "at least one embodiment"; the term "another embodiment" means "at least one additional embodiment"; the term "some embodiments" means "at least some embodiments." Related definitions of other terms will be given in following description.

It should be noted that the concepts of "first" and "second" etc. mentioned in the present disclosure are only used to distinguish between different apparatus, modules or units, and are not used to limit the order of functions performed by these apparatus, modules or units or their interdependence.

It should be noted that modifiers of "one" and "a plurality of" mentioned in the present disclosure are illustrative and not restrictive, and those skilled in the art should understand that they should be construed as "one or more" unless the context clearly indicates otherwise.

The names of messages or information interacted between a plurality of apparatus in the embodiments of the present disclosure are only used for illustration, and are not used to limit the scope of these messages or information.

FIG. 1 is a flow chart of a document processing method according to an exemplary embodiment of the present disclosure. As shown in FIG. 1, the method comprises step 101 to step 104.

In step 101, in response to a change in target document content, determining change information of the target document content, wherein, parent node of each text node in the target document content has its own identity identification, and each of the text nodes in the target document content has a node sequence number, which characterizes the order of the text node among its sibling text nodes. The sibling text nodes are sibling nodes belonging to the text node among all sibling nodes of the text node.

Target document content may change due to various reasons. For example, when the target document content is a novel that is being updated, the author may modify the content of the published novel somehow on the author's client-side according to demand, or it is also possible that the server-side will take the initiative to uniformly modify the content of some documents for other reasons. No matter what reason the target document content is changed, as long as the server finds that the target document content has changed, it can determine the change information according to the target document content before the change and the target document content after the change. While the form of change may also be in any form, for example, it can be changes in the text content, such as typo correction, punctuation mark modification, text modification, text addition or deletion, etc., or changes in the document format, such as blank line deletion, space removal, line break removal, etc.

Figure 2:
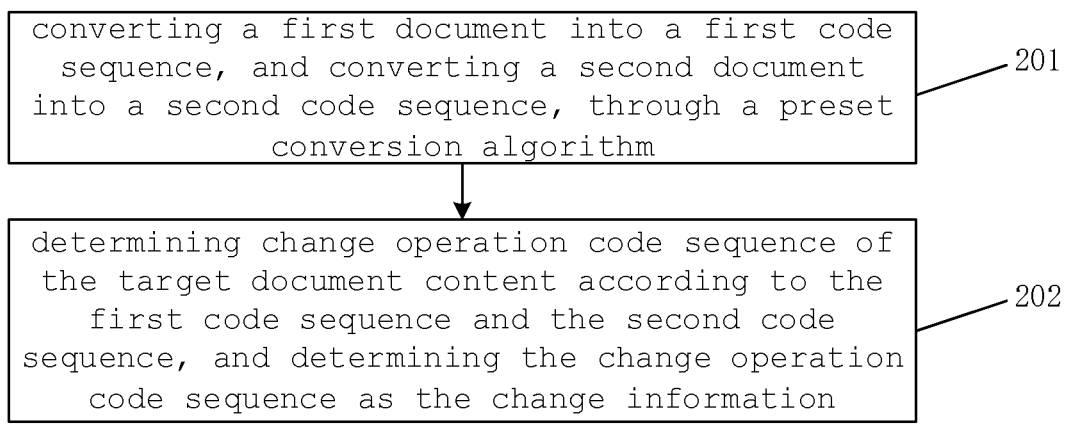
FIG. 2 is a flowchart of a method for determining change information in a document processing method according to an exemplary embodiment of the present disclosure.

In one possible implementation, the change information can be realized by any text comparison tool such as git diff. Specifically, the change information may be determined through steps 201 and 202 as shown in FIG. 2.

In step 201, converting a first document into a first code sequence, and converting a second document into a second code sequence, through a preset conversion algorithm, wherein the first document is the target document content before change, and the second document is the target document content after change, the first code sequence is obtained by converting from the text in each of the text nodes in the target document content before change, and the second code sequence is obtained by converting from the text in each of the text nodes in the target document content after change.

In step 202, determining change operation code sequence of the target document content according to the first code sequence and the second code sequence, and determining the change operation code sequence as the change information, wherein the change operation code sequence can characterize change operation information that needs to be performed on each of the text nodes in the first document when the first document is changed to the second document, and the change operation information may include, for example, the order of individual change operations, text nodes newly added in the second document, the text nodes of the first document that remains in the second document after change.

The above preset conversion algorithm may be, for example, a hash algorithm, through which text in each text node in the first document before change can be converted into a code, and the first code sequence is obtained according to the order of the text in each text node in the first document in the first document; similarly, the text in each text node in the second document after change can also be converted into a code, and the second code sequence is obtained according to the order of the text in each text node in the second document in the second document. Wherein, in the case of using the same preset conversion algorithm, the code converted from the same text in the first document and the second document is also the same. For example, a certain text node in the first document includes text "The weather is very good today", and the text has not changed and still exists in the certain text node in the second document, if the text in the first document is converted into a code A, the text in the second document may also be converted into the code A. Moreover, the process of converting the text into the code is independent of the position or order of the text in the document, as long as the text content does not change, the converted code will not change.

After the first code sequence and the second code sequence corresponding to the first document and the second document respectively are obtained through the preset conversion algorithm, operations required to change from the first code sequence to the second code sequence are determined to obtain the change operation code sequence. For example, if the first code sequence corresponding to the first document is ABCABBA, and the second code sequence corresponding to the second document is CBABAC, the resulting change operation code sequence may be: −A−BC+BAB−BA+C. Wherein, each code characterizes text content in one text node, where "−" means the operation to delete the code "A" from the first document, and "+" means the operation to add the code "B" to the first document, while codes without operation signs characterize text content that has not changed in the first document.

In one possible implementation, when it is determined that the target text content has changed, the target text content before the change and the target text content after the change can be coded uniformly, and then to determine the identity identification of the text node contained in the child node in each of the first document, and the node sequence number that characterizes the order of each text node in its sibling text nodes. Then, the change information of the target document content is determined according to the coded first document and the second document.

Figure 3:
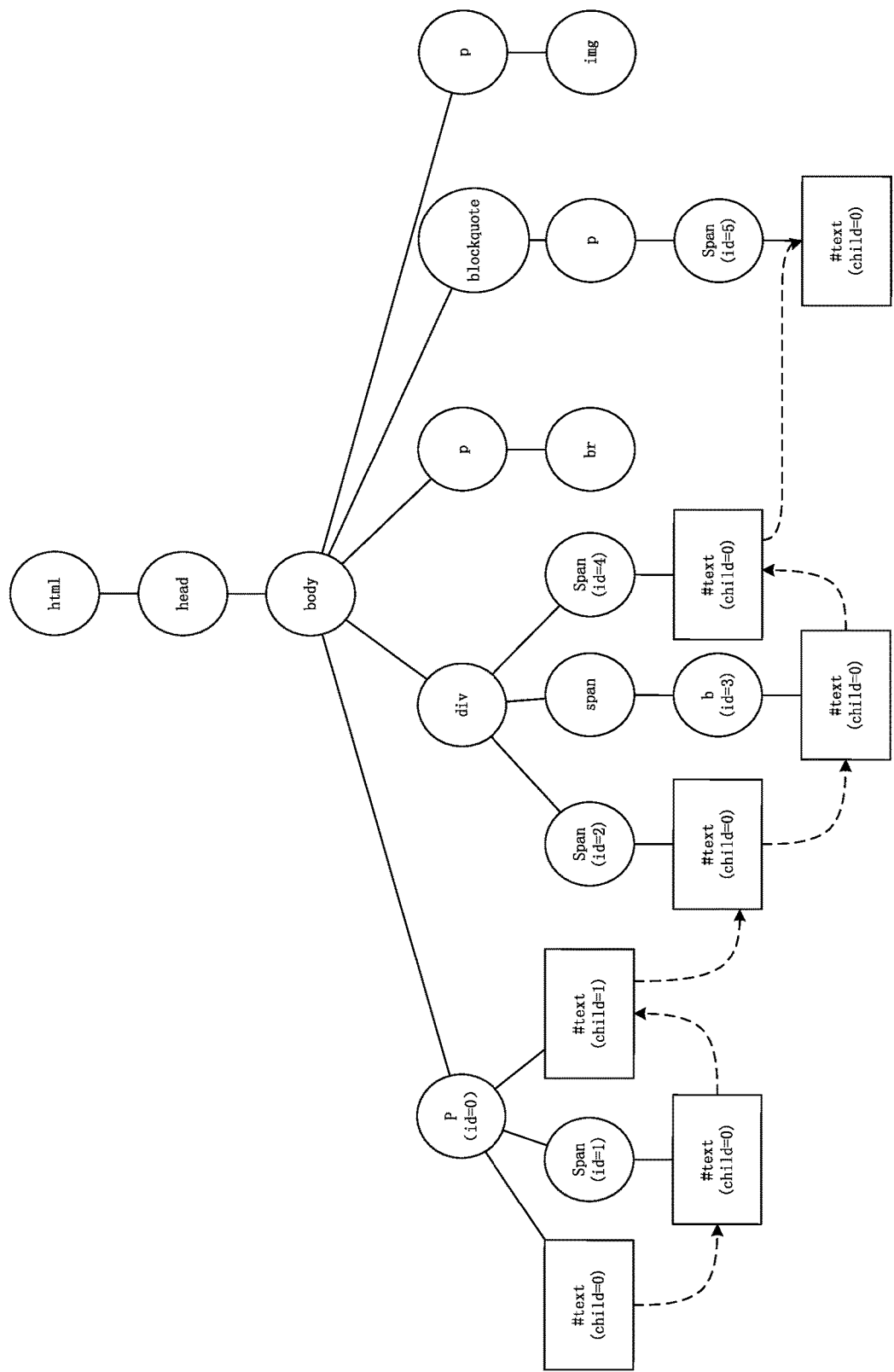
FIG. 3 is a schematic diagram of a tree structure for target document content according to an exemplary embodiment of the present disclosure.

FIG. 3 is a schematic diagram of a tree structure for target document content according to an exemplary embodiment of the present disclosure. As shown, when the target document content is displayed by way of a DOM (Document Object Model) tree, parent nodes (p, span, b, etc.) of individual text nodes (#text) have respective identity identifications, for example ID numbers, and the identity identification can also be determined according to the order of the parent node in the target document content; text nodes under the same parent node will have their respective node sequence numbers in accordance with respective order. The order may be an order from left to right of the DOM tree, as long as the node sequence number is enabled to indicate the order of the text in the text node in the target document content.

An example of a coded document shown according to an exemplary embodiment of the present disclosure is given below, if ordinary document content is as follows:
1. <p> hello world, <span>Tom is here </span> </p>,
2. <p> <span> this is Tuesday </span> </p>,
the document content in this disclosure should be as follows:
1. <p> <span "id"="0"> hello world, </span><span "id"="1" >Tom is here </span> </p>
2. <p> <span "id"="2" > this is Tuesday </span> </p>.

Taking the target document content as a novel as an example, if ordinary novel content is as follows:
<p>010. Rich woman Happy Ball?</p> <p> Jiang Siming, who was planning to go home after he bought an 18 yuan beef belly covered rice from a night snack stall outside, found a large billboard outside an office area. </p> <p> There are several big words written on it: "4 AM Jedi Survival Team Recruitment", and below are some recruitment information: </p> <p> At least 18 years old, </p> <p> The game duration is 2000 hours+, </p>, the document content in this disclosure should be as follows:
<p "id"="0" >010. Rich woman Happy Ball ?</p><p "id"="1"> Jiang Siming, who was planning to go home after he bought an 18 yuan beef belly covered rice from a night snack stall outside, found a large billboard outside an office area. </p><p "id"="2" > There are several big words written on it: "4 AM Jedi Survival Team Recruitment", and below are some recruitment information </p><p "id"="3" > At least 18 years old,</p><p "id"="4"> The game duration is 2000 hours+, </p>.

In step 102, according to the change information of the target document content, determining whether comment information corresponding to the target document content needs to perform position migration, the comment information including comment content and position information of the commented text.

After determining the change information, when judging whether the comment information corresponding to the target document content needs to perform position migration, it can be judged according to whether the commented text content corresponding to the comment information has changed, for example, if the commented text content corresponding to the original comment information is "The weather is very good today", and the text content is still "The weather is very good today" after the target document content has changed, and the order of the text content in the target document content has no change, then the position migration for the comment information may not be performed.

Specifically, when judging whether the comment information corresponding to the target document content needs to perform position migration, the position information of the commented text in the commented information, that is, node sequence numbers of the text nodes where start character and end character of the commented text are respectively located, and identity identification of parent nodes of the text nodes where the start character and the end character are respectively located, and character offset values of the start character and the end character in texts of the text nodes where they are located, can be first acquired; according to the text nodes where the start character and the end character of the commented text are respectively located, and the change information, it is determined whether codes corresponding to the text nodes where the start character and the end character of the commented text are respectively located have changed, and if it is judged that a change occurs, it is determined that the comment information included in the target document content needs to perform position migration.

The case where corresponding code above has changed includes not only the case where the corresponding code is deleted or added, etc., but also the case where the sequence position of the corresponding code in the second document has changed, for example, the change operation code sequence in the above example: −A−BC+BAB−BA+C, although the third code C therein corresponds to a text node whose content has not changed in the first document, but because in the first document, the order of the text node corresponding to the code C is the third, while it is the first in the second document, so position information of the text node corresponding to the code C has actually also changed.

Wherein, the position information of the commented text in the comment information can be expressed in the following form: <pidx_start, pidx_end, widx_start, widx_end>, wherein, pidx_start is the position of the text node where the start character in the commented text is located, including the node sequence number of the text node and the identity identification of the parent node of the text node, pidx_end is the position of the text node where the end character in the commented text is located, also including the node sequence number of the text node and the identity identification of the parent node of the text node, widx_start is the offset of the start character in the commented text in the text of the text node where it is located, and widx_end is the offset of the end character in the commented text in the text of the text node where it is located.

In step 103, if the comment information needs to perform position migration, performing position migration to the comment information according to the change information to obtain the comment information after position migration, the comment information after position migration including the comment content and position information of the commented text after position migration.

In one possible implementation, when the content of the text corresponding to the comment information does not change in the second document, but the position of the text node in the second document has changed, that is, in the case that the text node where the commented text is located remains in the second document, the position information of the text node where the text corresponding to the comment information is located in the second document can be directly used to perform position migration to the comment information, that is, updating the position of the comment information to the position of the text node where the commented text is located in the second document, the order in its sibling text nodes, and the identity identification of the parent node of the text node where the commented text is located, to perform position migration to the comment information.

In another possible implementation, when the content of the text corresponding to the comment information has changed in the second document, comment migration to the comment information can be performed according the degree of change of the text corresponding to the comment information in the second document, or the comment information can be deleted. Specific operation manners will be described in the following embodiments.

Through the above technical solutions, a document can be encoded accordingly, so that text in each text node in the document can correspond to its position information in the document, and after the document changes, position of text content before the change in the document after the change can still be determined, so that comment information corresponding to the document can perform respective position migration or deletion according to the situation of the document change after the document changes, so as to ensure that text content corresponding to the comment information would not appear completely inconsistent before and after the document changes, thereby improving the user experience.

Figure 4:
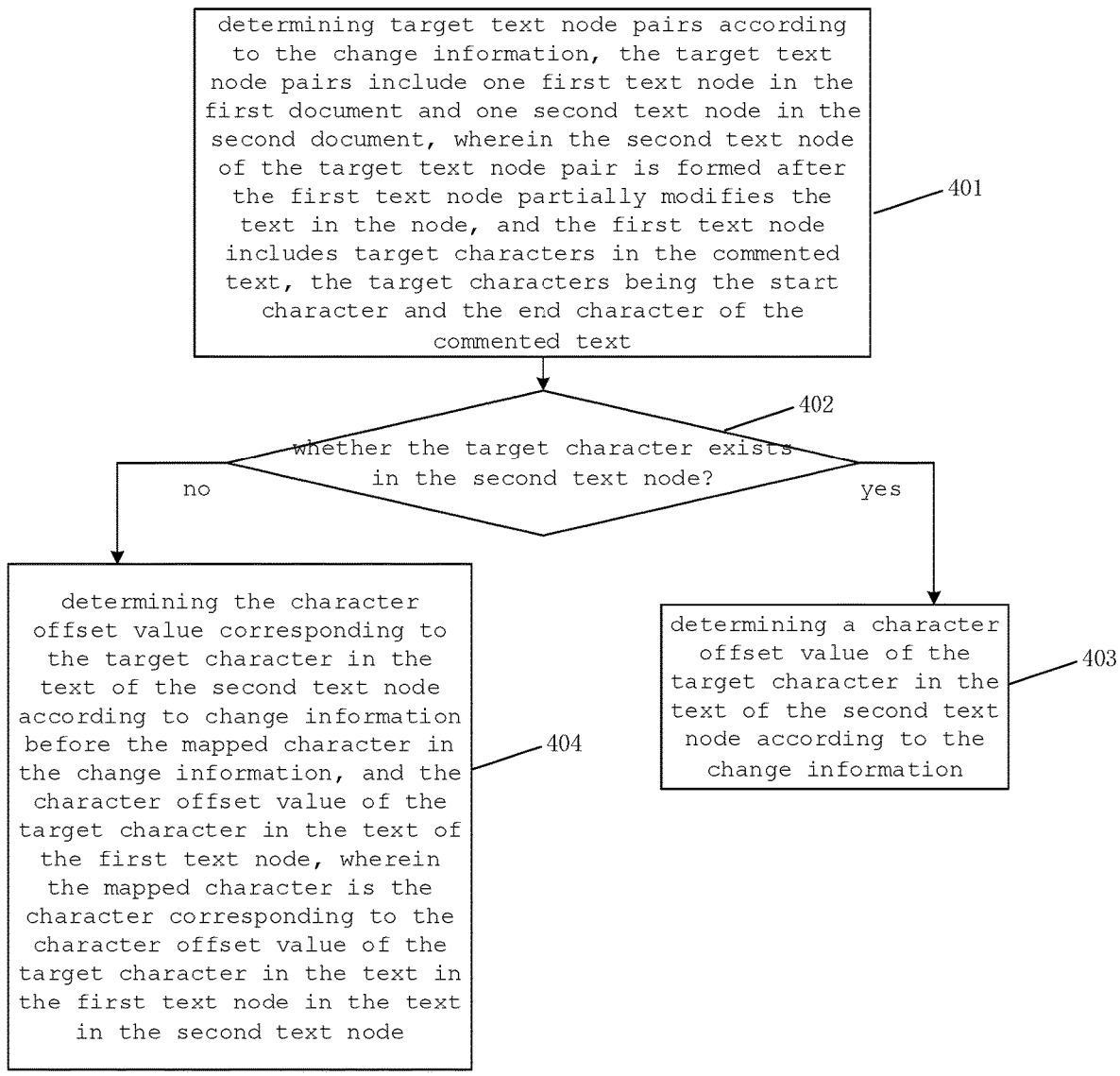
FIG. 4 is a flow chart of a method for performing position migration for the comment information according to yet another exemplary embodiment of the present disclosure.

FIG. 4 is a flow chart of a method for performing position migration for the comment information according to yet another exemplary embodiment of the present disclosure. As shown in FIG. 4, the method comprises steps 401 to 404.

In step 401, determining a target text node pair according to the change information, the target text node pair including one first text node in the first document and one second text node in the second document; wherein, the second text node in the target text node pair is formed after the first text node partially modifies the text in the node, and the first text node includes target characters of the commented text, the target characters being the start character and the end character of the commented text. For example, if text content of the first text node in the first document is "The weather is very good today", the corresponding code is A, while in the second document after change, the text content is changed to "Oh, the weather is very good today", then the code corresponding to the second text node corresponding to the changed text will be different from the code corresponding to the first text node, for example, the code corresponding to the second text node may be B. In a case that the change information is a change operation code sequence, the change operation code sequence will include change operations of −A and +B, while the −A and +B are the above target text node pair.

In step 402, judging whether the target character exists in the second text node, if yes, proceed to step 403, if not, proceed to step 404.

In step 403, determining a character offset value of the target character in the text of the second text node according to the change information. If the target character exists in the second text node in the target text node pair, it means that the target character has not been deleted during the process of changing the text in the first text node to the text of the second text node, so the character offset value of the target character in the second text node can be directly determined according to the change information. Wherein, the change information may also include text change operations required to change the first text node to the second text node. The text change operations are performed in unit of characters, that is, converting each character in the texts in the first text node and in the second text node into a code respectively, code change operations required for changing code sequence corresponding to the first text node into code sequence corresponding to the second text node are also the text change operations. While the process of determining the character offset value of the target character in the text in the second text node according to the change information can also be determined according to the text change operations corresponding to the target text node. For example, the sum of all change operations before the target character in the text change operations can be used as the modified value of the character offset, changing on the basis of the character offset value of the target character in the text of the first text node. For example, if the code sequence corresponding to the first text node is ABCABBA, and the code sequence corresponding to the second text node is BCABBAC, text change operations required to change the first text node to the second text node can be −ABCABBA+C, and if the target character is the first character C, the character offset value of the target character C in the first text node is 2, and change operations before the target character C in the text change operations includes one deletion, that is, −1, then according to the sum of the character offset value 2 of the target character C in the first text node and the change operation −1, it can be determined that the character offset value of the target character C in the second text node is 2+(−1)=1, that is, the target character C is the second character in the text in the second text node.

In step 404, determining the character offset value corresponding to the target character in the text of the second text node according to change information before the mapped character in the change information, and the character offset value of the target character in the text of the first text node, wherein the mapped character is the character corresponding to the character offset value of the target character in the text of the first text node in the text of the second text node. For example, the first text node and the second text node are as shown in the above example, and the target character is the character A that appears for the first time, and its corresponding character offset value in the first text node is 0, and the corresponding mapped character, that is, the character that appears for the first time in the second text node is character B. At this time, the final character offset value corresponding to the target character in the text of the second text node can be determined according to change operations before the character B that appears for the first time in the second text node, and the change operations include −A, that is, one deletion, −1, modifying on the basis of the character offset value of the target character A in the text of the first text node, and finally the character offset value corresponding to the target character A in the second text node can be obtained as −1, while since there is no negative number in the character offset value, the character offset value corresponding to the target character A in the second text node can be directly determined as 0.

After the character offset value in the second text node is determined by the above method, correspondingly, the position of the target character in the second document can be determined according to the corresponding identity identification and node sequence number of the second text node in the second document.

Through the above technical solutions, comment information corresponding to the text node can be retained even if text in part of text nodes in the target document has undergone a slight local modification, thereby reducing the degree of change in comment information as much as possible in case of the document content changes.

Figure 5:
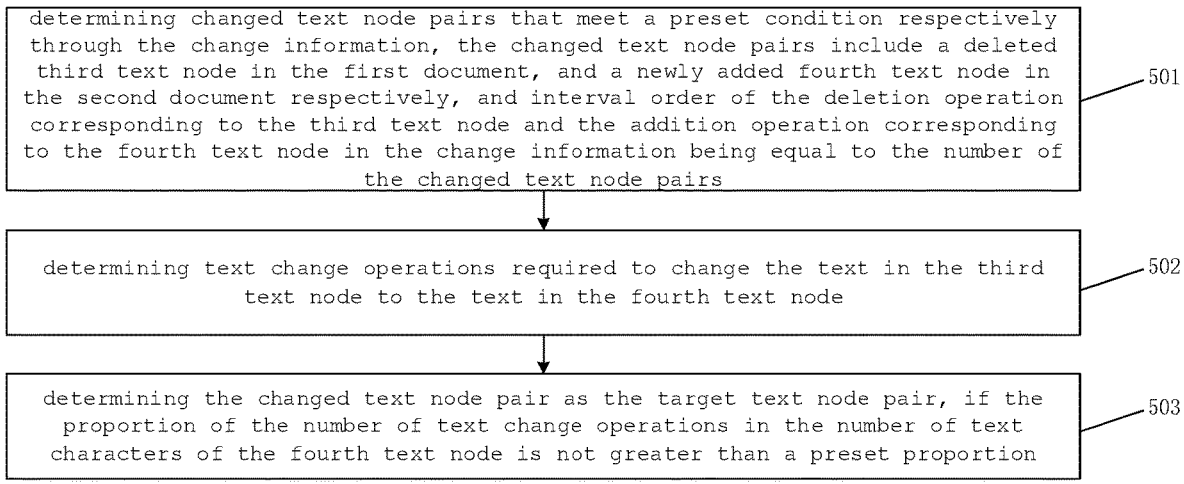
FIG. 5 is a flow chart of a method for determining a target text node pair in a document processing method according to yet another exemplary embodiment of the present disclosure.

FIG. 5 is a flow chart of a method for determining a target text node pair in a document processing method according to yet another exemplary embodiment of the present disclosure. As shown in FIG. 5, the method comprises step 501 to step 503.

In step 501, determining changed text node pairs that meet a preset condition through the change information respectively, the changed text node pairs including a deleted third text node in the first document, and a newly added fourth text node in the second document respectively. Moreover, interval order of the deletion operation corresponding to the third text node and the addition operation corresponding to the fourth text node in the change information is equal to the number of the changed text node pairs. That is, in order to judge which text nodes in the second document have text to be obtained through local and slight modification of the text in the first document, text nodes in the first document and text nodes in the second document need to be judged separately. The changed text node pairs that meet the conditions may be, for example, −A +B, −A −B +C +D, −A −B −C +D +E +F, etc., where −A, −A −B and −A −B −C are the third text nodes deleted in the first document, respectively, +B, +C +D, +D +E +F etc. are the fourth text nodes newly added in the second document, and in the case that there is only one changed text node pair, for example, −A +B, wherein the interval order of the third text node and the fourth text node in its change information is 1, and the position of the third text node −A in the change information plus one is the fourth text node corresponding to the third text node −A; while when there are two changed node pairs, for example, in a case that the change nodes include −A −B +C +D, the interval order should be 2. If the third text node is −A, its corresponding fourth text node should be a newly added node after two positions of the third text node −A, that is, +C. The preset condition may also be expressed as <i, i+n>(0<=i<n), where i represents the position of the third text node in the document, and n represents the number of all changed text node pairs included in the change information. When there is a node pair meeting the above condition in the change information, it can be used as the changed text node pair.

In step 502, determining text change operations required to change the text in the third text node to the text in the fourth text node. The text change operations may be text change operations in unit of characters, that is, converting each character in the texts in the third text node and in the fourth text node into a code, code change operations required for changing code sequence corresponding to the third text node into code sequence corresponding to the fourth text node are the text change operations.

In step 503, if the proportion of the number of text change operations in the number of text characters of the fourth text node is not greater than a preset proportion, determining the changed text node pair as the target text node pair.

For example, if code sequence corresponding to the third text node in the changed text node pair is ABCABBA, and code sequence corresponding to the fourth text node is DEFABBA, text change operations required for changing the first text node to the second text node may be −A−B−C+D+E+FABBA. In the text change operations, the number of change operations includes three deletions and three additions, a total of 6 change operations, while the number of text characters in the fourth text node is 7, and the number of change operations accounts for 6/7 of the number of text characters in the fourth text node, if the preset proportion is set to 30%, then the changed text node pair is not the target text node pair. If code sequence corresponding to the third text node in the changed text node pair is ABCABBA, and code sequence corresponding to the fourth text node is DBCABBA, text change operations required for changing the first text node to the second text node may be −A+DB-CABBA. In the text change operations, the number of change operations includes one deletion and one addition, a total of 2 change operations, while the number of text characters in the fourth text node is 7, and the number of change operations accounts for 2/7 of the number of text characters in the fourth text node, if the preset proportion is set to 30%, then the changed text node pair can be determined as the target text node pair.

In one possible implementation, the document processing method further comprises: sending the changed target document content and the comment information after the position migration corresponding to the changed target document content to a client-side. After receiving the changed target document content and the comment information, the client-side can display them according to specific situations. For example, it can directly display the changed target document content and the comment information at the same time, or it can display the target document content first according to the needs of a user to view the document, and then display the comment information when receiving an instruction for displaying comment input by the user. Therefore, the user can see the changed target document content through the client-side, and can see the comment information corresponding to the changed target document content accurately.

Figure 6:
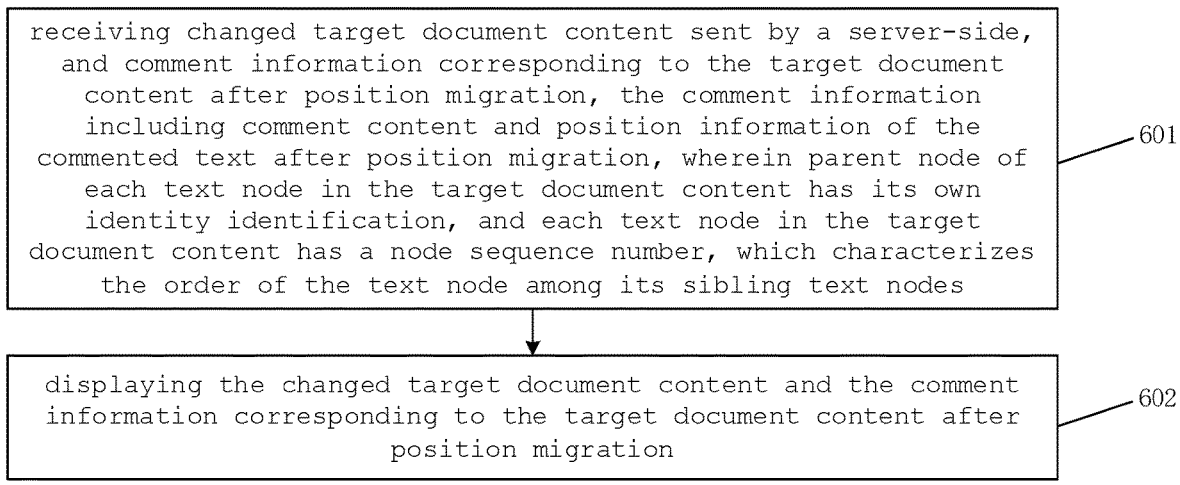
FIG. 6 is a flow chart of a document processing method according to an exemplary embodiment of the present disclosure.

FIG. 6 is a flow chart showing a document processing method according to an exemplary embodiment of the present disclosure. As shown in FIG. 6, the method comprises step 601 and step 602.

In step 601, receiving changed target document content sent by a server-side, and comment information corresponding to the target document content after position migration, wherein parent node of each text node in the target document content has its own identity identification, and each text node in the target document content has a node sequence number, which characterizes the order of the text node among its sibling text nodes.

For example, when the target document content is a novel that is being updated, the author may modify the content of the published novel on the author's client-side according to demand, which will result in the target document content on the server-side to change, or, it is also possible that the server-side will take the initiative to uniformly modify the content of some documents for other reasons, which will also result in the changed novel.

Each text node in the above target document content can determine its unique position in the target text content according to its node sequence number and the identity identification of its parent node. The position corresponding to the comment information after position migration may also be represented by position information of the text node. For example, the position of the comment information corresponding to the commented text can be represented through the node sequence number of the text node where the start character of the commented text is located and the identity identification of the parent node to which the node belongs, the character offset value of the start character in the text node, the node sequence number of the text node where the end character of the commented text is located and the identity identification of the parent node to which the node belongs, and the character offset value of the end character in the text node.

In step 602, displaying the changed target document content and the comment information corresponding to the target document content after position migration.

The above display method may be that when a user needs to view the target document content, first displaying the changed target document content without directly displaying comment content in the comment information; then determining the commented text according to position information of the commented text in the comment information after position migration, and highlighting the commented text, the highlighting being any one or more of a display mode of modifying background color of the text, a display mode of marking underline, and a display mode of modifying the text color; until an instruction for displaying comment input by the user is received, displaying the comment information corresponding to the instruction for displaying comment.

That is, when the user needs to view the target document content, comment content in the comment information corresponding to the target document content will not be displayed directly. However, the commented text will be determined according to the position information of the commented text in the comment information, and the commented text will be highlighted, so that the user can clearly know the text area corresponding to the commented content, thereby, if the user wants to view comment content corresponding to a highlighted text area, he or she can enter the instruction for displaying the comment by long pressing the text area, or double-clicking the text area, etc. After receiving the instruction for displaying the comment, the comment content corresponding to the text area can be displayed.

Through the above technical solutions, a document can be encoded accordingly, so that text in each text node in the document can correspond to its position information in the document, and after the document changes, position of text content before the change in the document after the change can still be determined; the target document and comment information corresponding to the target document content are displayed according to position information of each text node in the target document, so as to ensure that text content corresponding to the comment information would not appear completely inconsistent before and after the document changes, and display the target document content sent by a server-side and respective comment information accurately, thereby improving the user experience.

Figure 7:
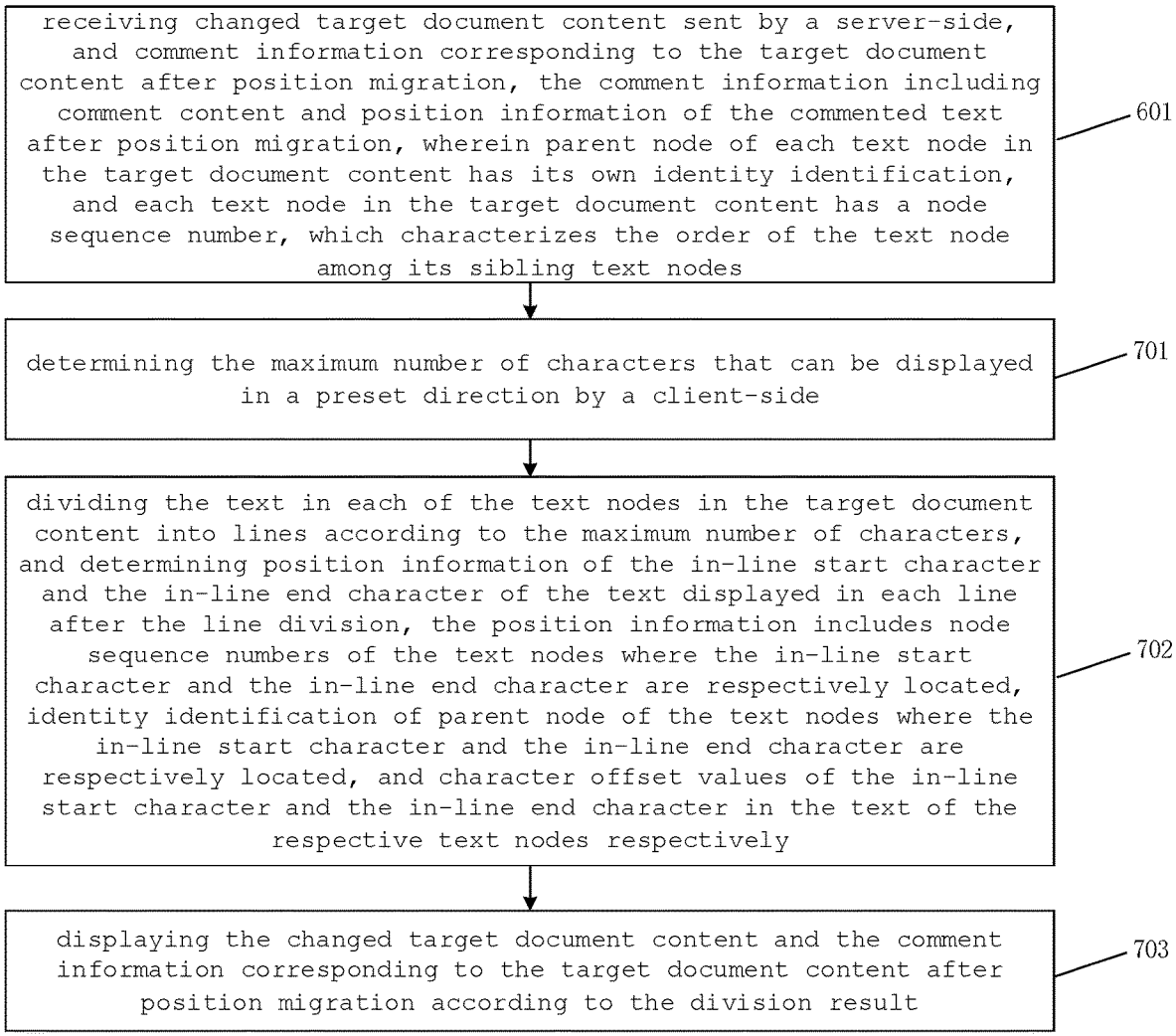
FIG. 7 is a flow chart of a document processing method according to yet another exemplary embodiment of the present disclosure.

FIG. 7 is a flow chart of a document processing method according to yet another exemplary embodiment of the present disclosure. As shown in FIG. 7, the method further comprises step 701 to step 703.

In step 701, determining the maximum number of characters displayed in a preset direction by a client-side.

The preset direction may be a row direction or a column direction and so on. When each client-side displays the target document content, the maximum number of characters that can be displayed in each row content bar or column content bar may be different, and the different may be due to different models, or may be due to different settings by client-sides. So, when displaying target document content sent by a server-side and comment information, it is necessary to first determine the maximum number of characters that can be displayed in the row content column or column content column of the client-side.

In step 702, dividing the text in each of the text nodes in the target document content into lines according to the maximum number of characters, and determining position information of the in-line start character and the in-line end character of the text displayed in each line after the line division, the position information including node sequence numbers of the text nodes where the in-line start character and the in-line end character are respectively located, identity identification of parent nodes of the text nodes where the in-line start character and the in-line end character are respectively located, and character offset values of the in-line start character and the in-line end character in the text of the respective text nodes respectively.

Wherein, the line division described here not only means a text division according to the row content bar, but also can characterize a text division according to the above column content bar, and can also characterize a text division according to any of the above preset directions.

The text content to be displayed in each row and column or in any preset direction in a client-side is divided before displaying, and in the case that positions of the in-line start character and the in-line end character of the text content to be displayed in each row, column or any preset direction are determined, the target document content can be displayed, and the text content displayed in the row can be quickly determined by the positions in the target document content corresponding to the in-line start character and the in-line end character in each row and column or in any preset direction.

In step 703, displaying the changed target document content and the comment information corresponding to the target document content after position migration according to the line division result.

Through the above technical solutions, it is possible to accurately display the target document content according to different client-sides, and it is possible to quickly locate the text content displayed in the row through the positions in the target document content corresponding to the in-line start character and the in-line end character in each row and column or in any preset direction.

Figure 8:
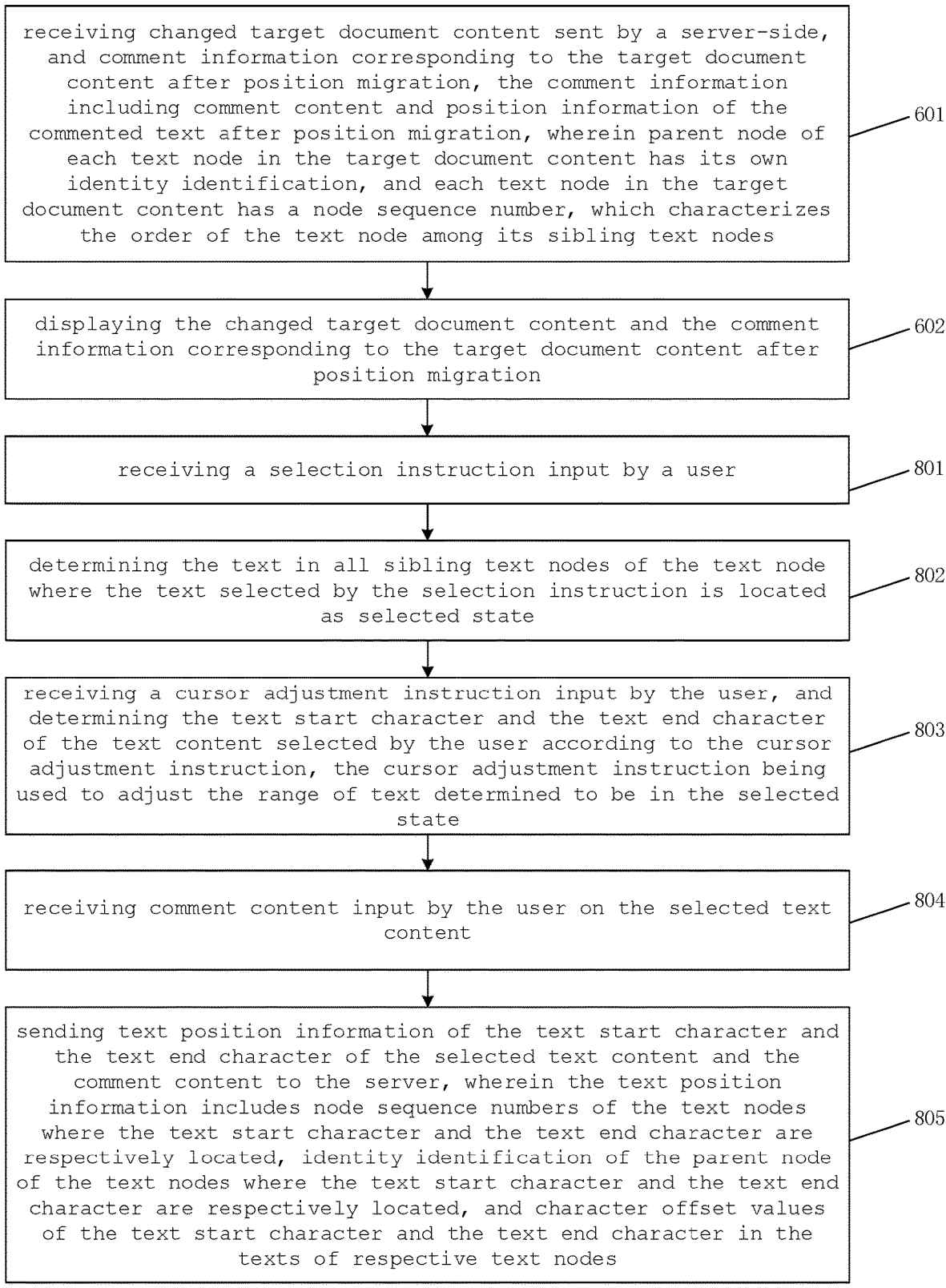
FIG. 8 is a flow chart of a document processing method according to yet another exemplary embodiment of the present disclosure.

FIG. 8 is a flow chart of a document processing method according to yet another exemplary embodiment of the present disclosure. As shown in FIG. 8, the method further comprises steps 801 to 805.

In step 801, receiving a selection instruction input by a user.

The selection instruction can be triggered by long pressing the screen, or through other UI interaction options.

In step 802, determining the text in all sibling text nodes of the text node where the text selected by the selection instruction is located as selected state.

In the case that the selected text of the selection instruction is determined, the text node where the line is located can be determined by positions in the target document content corresponding to the in-line start character and the in-line end character in the line where the text is located, so that all the text in the text node can be determined as selected state.

The text determined to be in the selected state may be marked according to a preset marking manner, and the marking manner includes at least highlighting mark, or may also be bolden mark and the like.

In step 803, receiving a cursor adjustment instruction input by the user, and determining the text start character and the text end character of the text content selected by the user according to the cursor adjustment instruction, the cursor adjustment instruction being used to adjust the range of text determined to be in the selected state.

The cursor adjustment instruction may be two different instructions for adjusting the text start character or the text end character in the text content selected by the user respectively.

In step 804, receiving comment content input by the user on the selected text content.

In step 805, sending text position information of the text start character and the text end character of the selected text content and the comment content to the server, wherein the text position information includes node sequence numbers of the text nodes where the text start character and the text end character are respectively located, identity identification of the parent node of the text nodes where the text start character and the text end character are respectively located, and character offset values of the text start character and the text end character in the texts of respective text nodes.

That is, after a user selects text content to comment on, position information of the commented text sent to a server will determine the text node corresponding to the comment according to node sequence numbers of the text node corresponding to the text start character and the text end character of the commented text respectively and identity identification of parent node to which they belongs, and can determine, through character offset values, the specific character positions of the text start character and the text end character in the text node where they are located.

Through the above technical solutions, a client-side can display target document content sent by a server and comment information according to character offset values, node sequence numbers, identity identification, etc. of the text in the above text nodes, and when receiving new comment information input by a user, the position of the new comment information can be determined according to the character offset values, the node sequence numbers, the identity identification, etc. of the text in the text node, and sent to the server, so that it can be guaranteed that when the server finds that the document content changes again, the server performs operations such as migration or deletion to the position of respective comment information.

Figure 9:
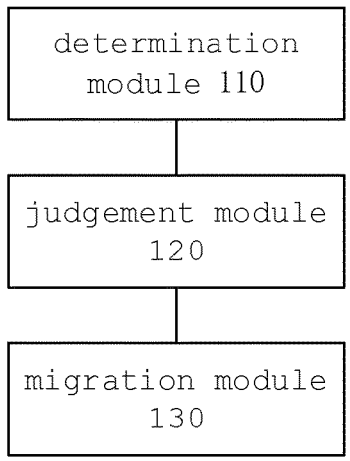
FIG. 9 is a structural block diagram of a document processing apparatus according to an exemplary embodiment of the present disclosure.

FIG. 9 is a structural block diagram of a document processing apparatus according to an exemplary embodiment of the present disclosure. As shown in FIG. 9, the apparatus comprises: a determination module 110 configured to determine change information of target document content in response to a change in the target document content, wherein, parent node of each text node in the target document content has its own identity identification, and each of the text nodes in the target document content has a node sequence number, which characterizes the order of the text node among its sibling text nodes; a judgement module 120 configured to determine whether comment information corresponding to the target document content needs to perform position migration according to the change information of the target document content, the comment information including comment content and position information of the commented text; a migration module 130 configured to perform position migration to the comment information according to the change information, to obtain comment information after position migration, if the comment information needs to perform position migration, the comment information after position migration including the comment content and position information of the commented text after position migration.

Through the above technical solutions, a document can be encoded accordingly, so that text in each text node in the document can correspond to its position information in the document, and after the document changes, position of text content before the change in the document after the change can still be determined, so that comment information corresponding to the document can perform respective position migration or deletion according to the situation of the document change after the document changes, so as to ensure that text content corresponding to the comment information would not appear completely inconsistent before and after the document changes, thereby improving the user experience.

In one possible implementation, the determination module 110 comprises: a conversion submodule configured to convert a first document into a first code sequence and convert a second document into a second code sequence through a preset conversion algorithm; wherein the first document is the target document content before change, and the second document is the target document content after change, the first code sequence is obtained by converting from the text in each of the text nodes in the target document content before change, and the second code sequence is obtained by converting from the text in each of the text nodes in the target document content after change; a first determination submodule configured to determine change operation code sequence of the target document content according to the first code sequence and the second code sequence, and determine the change operation code sequence as the change information; wherein the change operation code sequence characterizes change operation information that needs to be performed on each of the text nodes in the first document when the first document is changed to the second document.

In one possible implementation, the judgement module 120 comprises: an acquisition submodule configured to determine the text node where the start character and the end character of the commented text are respectively located according to position information of the commented text in the comment information, wherein the position information of the commented text includes the node sequence numbers of the text nodes where the start character and end character of the commented text of the first document are respectively located, and identity identification of parent nodes of the text nodes where the start character and the end character are respectively located, and character offset values of the start character and the end character respectively in the texts of the text nodes where they are located; a judgement submodule configured to determine whether codes corresponding to the text nodes where the start character and the end character of the commented text are respectively located have changed according to the text nodes where the start character and the end character of the commented text are respectively located, and the change information, and if it is judged that a change occurs, determine that the comment information included in the target document content needs to perform position migration.

In one possible implementation, the migration module 130 comprises: a second determination submodule configured to determine a target text node pair according to the change information, the target text node pair including one first text node in the first document and one second text node in the second document, wherein, the second text node in the target text node pair is formed after the first text node partially modifies the text in the node, and the first text node includes target characters in the commented text, the target characters being the start character and the end character in the commented text; a third determination submodule configured to determine character offset value of the target character in the text of the second text node according to the change information when the target character exists in the second text node; a fourth determination submodule configured to determine the character offset value corresponding to the target character in the text of the second text node according to a change information in the change information before a mapped character, and the character offset value of the target character in the text of the first text node when the target character does not exist in the second text node, wherein the mapped character is the character corresponding to the character offset value of the target character in the text of the first text node in the text of the second text node.

In one possible implementation, the second determination submodule comprises: a fifth determination submodule configured to determine changed text node pairs that meet a preset condition through the change information respectively, the changed text node pairs including a deleted third text node in the first document, and a newly added fourth text node in the second document respectively, moreover, interval order of the deletion operation corresponding to the third text node and the addition operation corresponding to the fourth text node in the change information being equal to the number of the changed text node pairs; a sixth determination submodule configured to determine to text change operations required to change the text in the third text node to the text in the fourth text node; a seventh determination submodule configured to determine the changed text node pair as the target text node pair if the proportion of the number of text change operations in the number of text characters of the fourth text node is not greater than a preset proportion.

In one possible implementation, the migration module 130 is further configured to: if the text node where the commented text is located remains in the second document, perform position migration to the comment information according to the order of the text node where the commented text is located in its sibling text nodes in the second document, and identity identification of the parent node of the text node where the commented text is located.

In one possible implementation, the apparatus further comprises a sending module configured to send the changed target document content and comment information after the position migration corresponding to the changed target document content to a client-side.

Figure 10:
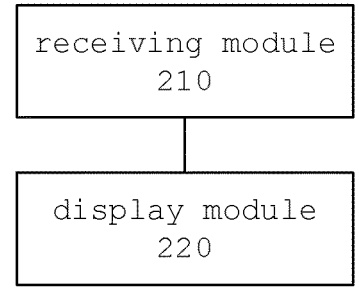
FIG. 10 is a structural block diagram of a document processing apparatus according to an exemplary embodiment of the present disclosure.

FIG. 10 is a structural block diagram of a document processing apparatus according to an exemplary embodiment of the present disclosure. As shown in FIG. 10, the apparatus comprises: a receiving module 210 configured to receive changed target document content sent by a server-side, and comment information corresponding to the target document content after position migration, the comment information including comment content and position information of the commented text; wherein, parent node of each text node in the target document content has its own identity identification, and each of the text nodes in the target document content has a node sequence number, which characterizes the order of the text node among its sibling text nodes; and a display module 220 configured to display the changed target document content and the comment information corresponding to the target document content after position migration.

Through the above technical solutions, a document can be encoded accordingly, so that text in each text node in the document can correspond to its position information in the document, and after the document changes, position of text content before the change in the document after the change can still be determined; the target document and comment information corresponding to the target document content are displayed according to position information of each text node in the target document, so as to ensure that text content corresponding to the comment information would not appear completely inconsistent before and after the document changes, and display the target document content sent by a server-side and respective comment information accurately, thereby improving the user experience.

In one possible implementation, the display module 220 comprises: an eighth determination submodule configured to determine the maximum number of characters displayed in a preset direction by a client-side; a line division submodule configured to divide the text in each of the text nodes in the target document content into lines according to the maximum number of characters, and determine position information of the in-line start character and the in-line end character of the text displayed in each line after the line division; the position information including node sequence numbers of the text nodes where the in-line start character and the in-line end character are respectively located, identity identification of parent nodes of the text nodes where the in-line start character and the in-line end character are respectively located, and character offset values of the in-line start character and the in-line end character in the text of the respective text nodes respectively; a display submodule configured to display the changed target document content and the comment information corresponding to the target document content after position migration according to the line division result.

In one possible implementation, the apparatus further comprises: a first receiving module configured to receive a selection instruction input by a user; a selection module configured to determine the text in all sibling text nodes of the text node where the text selected by the selection instruction is located as selected state; a second receiving module configured to receive a cursor adjustment instruction input by the user, and determine the text start character and the text end character of the text content selected by the user according to the cursor adjustment instruction, the cursor adjustment instruction being used to adjust the range of text determined to be in the selected state; a third receiving module configured to receive comment content input by the user on the selected text content; a sending module configured to send text position information of the text start character and the text end character of the selected text content and the comment content to the server, wherein the text position information includes node sequence numbers of the text nodes where the text start character and the text end character are respectively located, identity identification of the parent node of the text nodes where the text start character and the text end character are respectively located, and character offset values of the text start character and the text end character in the texts of respective text nodes.

In one possible implementation, the apparatus further comprises: a marking module configured to mark the text determined to be in the selected state according to a preset marking manner, the marking manner including at least highlighting mark.

In one possible implementation, the display module 220 further comprises: a first display submodule configured to display the changed target document content; a second display submodule configured to determine the commented text according to position information of the commented text in the comment information after position migration, and highlight the commented text, the highlighting being any one or more of a display mode of modifying background color of the text, a display mode of marking underline, and a display mode of modifying the text color; a third display submodule configured to display the comment information corresponding to an instruction for displaying comment when the instruction for displaying comment input by the user is received.

Figure 11:
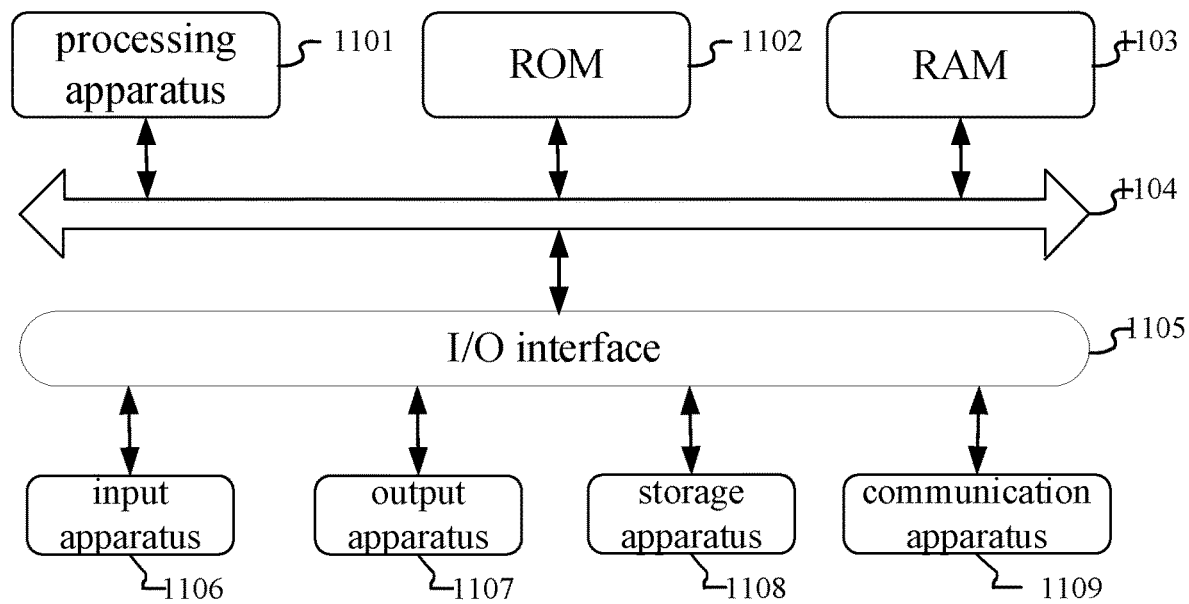
FIG. 11 shows a schematic structural diagram of an electronic device suitable for implementing the embodiments of the present disclosure.

Referring to FIG. 11 below, it shows a schematic structural diagram of an electronic device 1100 suitable for implementing an embodiment of the present disclosure. The terminal device in the embodiment of the present disclosure may include but not limited to a mobile terminal such as a mobile phone, a notebook, a digital broadcast receiver, a PDA (Personal Digital Assistant), a PAD (tablet), a PMP (Portable Multimedia Player), a vehicle-mounted terminal (for example, a vehicle-mounted navigation terminal), etc. and a fixed terminal such as a digital TV, a desktop computer, etc. The electronic device shown in FIG. 11 is only one example, and should not bring any limitation to functions and usage scopes of embodiments of the present disclosure.

As shown in FIG. 11, the electronic device 1100 may include a processing apparatus (for example a central processing unit, a graphics processor, etc.) 1101, which can execute various appropriate actions and processes according to a program stored in a read-only memory (ROM) 1102 or a program loaded from a storage 1108 into a random-access memory (RAM) 1103. In the RAM 1103, various programs and data required for the operation of the electronic device 1100 are also stored. The processing apparatus 1101, ROM 1102, and RAM 1103 are connected to each other through a bus 1104. An input/output (I/O) interface 1105 is also connected to the bus 1104.

Generally, the following apparatus can be connected to the I/O interface 1105: an input device 1106 including for example, a touch screen, a touch pad, a keyboard, a mouse, a camera, a microphone, an accelerometer, a gyroscope, etc.; an output device 1107 including for example, a liquid crystal display (LCD), a speaker, a vibrator, etc.; a storage 1108 including for example, a magnetic tape, a hard disk, etc.; and a communication apparatus 1109. The communication apparatus 1109 may allow the electronic device 1100 to perform wireless or wired communication with other devices to exchange data. Although FIG. 11 shows an electronic device 1100 having various apparatus, it should be understood that it is not required to implement or have all of the illustrated apparatus. It can alternatively be implemented or provided with more or fewer apparatus.

In particular, according to an embodiment of the present disclosure, the process described above with reference to the flowchart can be implemented as a computer software program. For example, an embodiment of the present disclosure includes A computer program product, which includes computer programs carried on a non-transitory computer readable medium, and the computer programs contain program codes for executing the method shown in the flowchart. In such an embodiment, the computer programs may be downloaded and installed from the network through the communication apparatus 1109, or installed from the storage 1108, or installed from the ROM 1102. When the computer programs are executed by the processing apparatus 1101, above functions defined in the methods of the embodiments of the present disclosure are executed.

It should be noted that above computer-readable medium in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus, or device, or any combination thereof. More specific examples of computer-readable storage media may include, but are not limited to: an electrical connection with one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, in which a computer-readable program code is carried. This propagated data signal can take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium can be transmitted by any suitable medium, including but not limited to: wire, optical cable, RF (Radio Frequency), etc., or any suitable combination thereof.

In some embodiments, client, server can use any currently known or future developed network protocol, such as HTTP (HyperText Transfer Protocol) for communication, and can interconnect with digital data communication (for example, communication network) in any form or medium. Examples of communication networks include local area networks ("LAN"), wide area networks ("WAN"), international network (for example, the Internet), and end-to-end networks (for example, ad hoc end-to-end networks), as well as any currently known or future developed networks.

The above computer-readable medium may be included in above electronic devices; or it may exist alone without being assembled into the electronic device.

The above computer-readable medium carries one or more programs, which, when executed by the electronic device, cause the electronic device to: in response to a change in target document content, determining change information of the target document content, wherein, parent node of each text node in the target document content has its own identity identification, and each of the text nodes in the target document content has a node sequence number, which characterizes the order of the text node among its sibling text nodes; determining whether comment information corresponding to the target document content needs to perform position migration according to the change information of the target document content, the comment information including comment content and position information of the commented text; and performing position migration to the comment information according to the change information, to obtain comment information after position migration, if the comment information needs to perform position migration, the comment information after position migration including the comment content and position information of the commented text after position migration.

Alternatively, the above computer-readable medium carries one or more programs, which, when executed by the electronic device, cause the electronic device to: receive changed target document content sent by a server-side, and comment information corresponding to the target document content after position migration, the comment information including comment content and position information of the commented text after position migration; wherein, parent node of each text node in the target document content has its own identity identification, and each of the text nodes in the target document content has a node sequence number, which characterizes the order of the text node among its sibling text nodes; and display the changed target document content and the comment information corresponding to the target document content after position migration.

The computer program codes for performing the operations of the present disclosure can be written in one or more programming languages or a combination thereof. The above programming languages include but are not limited to object-oriented programming languages such as Java, Smalltalk, C++, and include conventional procedural programming languages such as "C" language or similar programming languages. The program code can be executed entirely on a user's computer, partly executed on a user's computer, executed as an independent software package, partly executed on a user's computer and partly executed on a remote computer, or entirely executed on a remote computer or server. In the case of involving a remote computer, the remote computer can be connected to a user's computer through any kind of network, including a local area network (LAN) or a wide area network (WAN), or it can be connected to an external computer (for example, connected by using Internet provided by an Internet service provider).

The flowcharts and block diagrams in the accompanying drawings illustrate possible architecture, function, and operation implementations of a system, method, and computer program product according to various embodiments of the present disclosure. In this regard, each block in a flowchart or block diagram may represent a module, program segment, or part of code, which contains one or more executable instructions for realizing specified logic functions. It should also be noted that, in some alternative implementations, functions marked in a block may also occur in a different order than the order marked in the drawings. For example, two blocks shown in succession can actually be executed substantially in parallel, and they can sometimes be executed in the reverse order, depending on functions involved. It should also be noted that each block in a block diagram and/or flowchart, and the combination of blocks in a block diagram and/or flowchart, can be implemented by a dedicated hardware-based system that performs the specified functions or operations, or it can be implemented by a combination of dedicated hardware and computer instructions.

The modules involved in the embodiments of the present disclosure can be implemented in software or hardware. Wherein, the name of the module does not constitute a limitation on the module itself under certain circumstances. For example, the determination module can also be described as "a module that determines change information of a target document content in response to changes in the target document content".

The functions described herein above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of machine-readable storage media may include an electrical connection based on one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

According to one or more embodiments of the present disclosure, Example 1 provides a document processing method, comprising:

receiving changed target document content sent by a server-side, and comment information corresponding to the target document content after position migration, the comment information including comment content and position information of the commented text; wherein, parent node of each text node in the target document content has its own identity identification, and each of the text nodes in the target document content has a node sequence number, which characterizes the order of the text node among its sibling text nodes;

displaying the changed target document content and the comment information corresponding to the target document content after position migration when a respective display instruction is received.

According to one or more embodiments of the present disclosure, Example 2 provides the method of Example 1, the displaying the changed target document content and the comment information corresponding to the target document content after position migration comprises:

determining the maximum number of characters displayed in a preset direction by a client-side;

dividing the text in each of the text nodes in the target document content into lines according to the maximum number of characters, and determining position information of the in-line start character and the in-line end character of the text displayed in each line after the line division; the position information including node sequence numbers of the text nodes where the in-line start character and the in-line end character are respectively located, identity identification of parent nodes of the text nodes where the in-line start character and the in-line end character are respectively located, and character offset values of the in-line start character and the in-line end character in the text of the respective text nodes respectively; and displaying the changed target document content and the comment information corresponding to the target document content after position migration according to the line division result.

According to one or more embodiments of the present disclosure, Example 3 provides the method of Example 2, the method further comprising:

receiving a selection instruction input by a user;

determining the text in all sibling text nodes of the text node where the text selected by the selection instruction is located as selected state;

receiving a cursor adjustment instruction input by the user, and determine the text start character and the text end character of the text content selected by the user according to the cursor adjustment instruction, the cursor adjustment instruction being used to adjust the range of text determined to be in the selected state;

receiving comment content input by the user on the selected text content; and sending text position information of the text start character and the text end character of the selected text content and the comment content to the server, wherein the text position information includes node sequence numbers of the text nodes where the text start character and the text end character are respectively located, identity identification of the parent node of the text nodes where the text start character and the text end character are respectively located, and character offset values of the text start character and the text end character in the texts of respective text nodes.

According to one or more embodiments of the present disclosure, Example 4 provides the method of Example 3, the method further comprising:

marking the text determined to be in the selected state according to a preset marking manner, the marking manner including at least highlighting mark.

According to one or more embodiments of the present disclosure, Example 5 provides the method of Example 1, the displaying the changed target document content and the comment information corresponding to the target document content after position migration comprises:

displaying the changed target document content;

determining the commented text according to position information of the commented text in the comment information after position migration, and highlight the commented text, the highlighting being one or more of a display mode of modifying background color of the text, a display mode of marking underline, and a display mode of modifying the text color; and displaying the comment information corresponding to an instruction for displaying comment when the instruction for displaying comment input by the user is received.

According to one or more embodiments of the present disclosure, Example 6 provides a document processing method, comprising:

determining change information of target document content in response to a change in the target document content, wherein, parent node of each text node in the target document content has its own identity identification, and each of the text nodes in the target document content has a node sequence number, which characterizes the order of the text node among its sibling text nodes;

determining whether comment information corresponding to the target document content needs to perform position migration according to the change information of the target document content, the comment information including comment content and position information of the commented text; and performing position migration to the comment information according to the change information, to obtain comment information after position migration, if the comment information needs to perform position migration, the comment information after position migration including the comment content and position information of the commented text after position migration.

According to one or more embodiments of the present disclosure, Example 7 provides the method of Example 6, the determining change information of target document content in response to a change in the target document content comprises:

converting a first document into a first code sequence and convert a second document into a second code sequence through a preset conversion algorithm; wherein the first document is the target document content before change, and the second document is the target document content after change, the first code sequence is obtained by converting from the text in each of the text nodes in the target document content before change, and the second code sequence is obtained by converting from the text in each of the text nodes in the target document content after change; and determining change operation code sequence of the target document content according to the first code sequence and the second code sequence, and determine the change operation code sequence as the change information; wherein the change operation code sequence characterizes change operation information that needs to be performed on each of the text nodes in the first document when the first document is changed to the second document.

According to one or more embodiments of the present disclosure, Example 8 provides the method of Example 7, the determining whether the comment information corresponding to the target document content needs to perform position migration according to the change information of the target document content comprises:

determining the text node where the start character and the end character of the commented text are respectively located according to position information of the commented text in the comment information, wherein the position information of the commented text includes the node sequence numbers of the text nodes where the start character and end character of the commented text of the first document are respectively located, and identity identification of parent nodes of the text nodes where the start character and the end character are respectively located, and character offset values of the start character and the end character respectively in the texts of the text nodes where they are located; and determining whether codes corresponding to the text nodes where the start character and the end character of the commented text are respectively located have changed according to the text nodes where the start character and the end character of the commented text are respectively located, and the change information, and if it is judged that a change occurs, determine that the comment information included in the target document content needs to perform position migration.

According to one or more embodiments of the present disclosure, Example 9 provides the method of Example 8, the performing position migration to the comment information according to the change information comprises:

determining a target text node pair according to the change information, the target text node pair including one first text node in the first document and one second text node in the second document; wherein, the second text node in the target text node pair is formed after the first text node partially modifies the text in the node, and the first text node includes target characters of the commented text, the target characters being the start character and the end character in the commented text;

determining character offset value of the target character in the text of the second text node according to the change information when the target character exists in the second text node; and determining the character offset value corresponding to the target character in the text in the second text node according to a change information in the change information before a mapped character, and the character offset value of the target character in the text in the first text node when the target character does not exist in the second text node, wherein the mapped character is the character corresponding to the character offset value of the target character in the text in the first text node in the text in the second text node.

According to one or more embodiments of the present disclosure, Example 10 provides the method of Example 9, the determining target text node pairs according to the change information comprises:

determining changed text node pairs that meet a preset condition through the change information respectively, the changed text node pairs including a deleted third text node in the first document, and a newly added fourth text node in the second document respectively, moreover, interval order of the deletion operation corresponding to the third text node and the addition operation corresponding to the fourth text node in the change information being equal to the number of the changed text node pairs;

determining text change operations required to change the text in the third text node to the text in the fourth text node;

determining the changed text node pair as the target text node pair if the proportion of the number of text change operations in the number of text characters of the fourth text node is not greater than a preset proportion.

According to one or more embodiments of the present disclosure, Example 11 provides the method of Example 8, the performing position migration to the comment information according to the change information comprises:

if the text node where the commented text is located remains in the second document, performing position migration to the comment information according to the order of the text node where the commented text is located in its sibling text nodes in the second document, and identity identification of the parent node of the text node where the commented text is located.

According to one or more embodiments of the present disclosure, Example 12 provides the method of Example 6, the method further comprising:

sending the changed target document content and comment information after the position migration corresponding to the changed target document content to a client-side.

According to one or more embodiments of the present disclosure, Example 13 provides a document processing apparatus, comprising:
- a receiving module configured to receive changed target document content sent by a server-side, and comment information corresponding to the target document content after position migration, the comment information including comment content and position information of the commented text; wherein, parent node of each text node in the target document content has its own identity identification, and each of the text nodes in the target document content has a node sequence number, which characterizes the order of the text node among its sibling text nodes; and
- a display module configured to display the changed target document content and the comment information corresponding to the target document content after position migration.

According to one or more embodiments of the present disclosure, Example 14 provides a document processing apparatus, comprising:
- a determination module configured to determine change information of the target document content in response to a change in the target document content, wherein parent node of each text node in the target document content has its own identity identification, and each of the text nodes in the target document content has a node sequence number, which characterizes the order of the text node among its sibling text nodes;
- a judgement module configured to determine whether comment information corresponding to the target document content needs to perform position migration according to the change information of the target document content, the comment information including comment content and position information of the commented text; and
- a migration module configured to perform position migration to the comment information according to the change information, to obtain comment information after position migration, if the comment information needs to perform position migration, the comment information after position migration including the comment content and position information of the commented text after position migration.

According to one or more embodiments of the present disclosure, Example 15 provides a computer-readable medium having computer programs stored thereon, which, when executed by a processing apparatus, implement the steps of any of the methods described in Examples 1-5.

According to one or more embodiments of the present disclosure, example 16 provides an electronic device, comprising:
- a storage apparatus having computer programs stored thereon;
- a processing apparatus configured to execute the computer programs in the storage apparatus to implement the steps of any one of the methods in Examples 1-5.

According to one or more embodiments of the present disclosure, Example 17 provides a computer-readable medium having computer programs stored thereon, which, when executed by a processing apparatus, implement the steps of any of the methods described in Examples 6-12.

According to one or more embodiments of the present disclosure, Example 18 provides an electronic device, comprising:
- a storage apparatus having computer programs stored thereon;
- a processing apparatus configured to execute the computer programs in the storage apparatus, to implement the steps of any of the methods in Examples 6-12.

The above description is only preferred embodiments of the present disclosure and an explanation to the technical principles applied. Those skilled in the art should understand that the scope of disclosure involved in this disclosure is not limited to technical solutions formed by specific combination of above technical features, and should also cover other technical solutions formed by arbitrarily combining above technical features or equivalent features thereof without departing from above disclosed concept. For example, those technical solutions formed by exchanging of above features and technical features disclosed in the present disclosure (but not limited to) having similar functions with each other.

In addition, although various operations are depicted in a specific order, this should not be understood as requiring these operations to be performed in the specific order shown or performed in a sequential order. Under certain circumstances, multitasking and parallel processing may be advantageous. Likewise, although several specific implementation details are included in above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in a language specific to structural features and/or logical actions of the method, it should be understood that the subject matter defined in the appended claims is not necessarily limited to the specific features or actions described above. Rather, the specific features and actions described above are merely exemplary forms of implementing the claims. Regarding the apparatus in the above embodiments, the specific manner in which each module performs operations has been described in detail in the method embodiments, which will not be described in detail here.

What is claimed is:
1. A document processing method, the method comprises:
determining change information of target document content in response to a change in the target document content, wherein, parent node of each text node in the target document content has its own identity identification, and each of the text nodes in the target document content has a node sequence number, which characterizes the order of the text node among its sibling text nodes;
determining whether comment information corresponding to the target document content needs to perform position migration according to the change information of the target document content, the comment information including comment content and position information of the commented text, wherein the position information of the commented text includes node sequence numbers of the text nodes where a start character and end character of the commented text are respectively located, identity identification of parent nodes of the text nodes where the start character and the end character are respectively located, and character offset values of the start character and the end character respectively in texts of the text nodes where the start character and the end character are located; and
performing position migration to the comment information according to the change information, to obtain comment information after position migration, if the comment information needs to perform position migration, the comment information after position migration including the comment content and position information of the commented text after position migration.

2. The method according to claim 1, wherein the determining change information of target document content in response to a change in the target document content comprises:
converting a first document into a first code sequence and converting a second document into a second code sequence through a preset conversion algorithm; wherein the first document is the target document content before change, and the second document is the target document content after change, the first code sequence is obtained by converting from the text in each of the text nodes in the target document content before change, and the second code sequence is obtained by converting from the text in each of the text nodes in the target document content after change; and
determining change operation code sequence of the target document content according to the first code sequence and the second code sequence, and determining the change operation code sequence as the change information; wherein the change operation code sequence characterizes change operation information that needs to be performed on each of the text nodes in the first document when the first document is changed to the second document.

3. The method according to claim 2, wherein the determining whether the comment information corresponding to the target document content needs to perform position migration according to the change information of the target document content comprises:
determining the text node where the start character and the end character of the commented text are respectively located according to position information of the commented text in the comment information; and
determining whether codes corresponding to the text nodes where the start character and the end character of the commented text are respectively located have changed according to the text nodes where the start character and the end character of the commented text are respectively located, and the change information, and if it is judged that a change occurs, determining that the comment information included in the target document content needs to perform position migration.

4. The method according to claim 3, wherein the performing position migration to the comment information according to the change information comprises:
determining a target text node pair according to the change information, the target text node pair including one first text node in the first document and one second text node in the second document; wherein, the second text node in the target text node pair is formed after the first text node partially modifies the text in the node, and the first text node includes target characters of the commented text, the target characters being the start character and the end character in the commented text;
determining character offset value of the target character in the text of the second text node according to the change information when the target character exists in the second text node; and
determining the character offset value corresponding to the target character in the text in the second text node according to a change information in the change information before a mapped character, and the character offset value of the target character in the text in the first text node when the target character does not exist in the second text node; wherein the mapped character is the character corresponding to the character offset value of the target character in the text in the first text node in the text in the second text node.

5. The method according to claim 4, wherein the determining target text node pairs according to the change information comprises:
determining changed text node pairs that meet a preset condition through the change information respectively, the changed text node pairs including a deleted third text node in the first document, and a newly added fourth text node in the second document respectively, and interval order of the deletion operation corresponding to the third text node and the addition operation corresponding to the fourth text node in the change information being equal to the number of the changed text node pairs;
determining text change operations required to change the text in the third text node to the text in the fourth text node;
determining the changed text node pair as the target text node pair if the proportion of the number of text change operations in the number of text characters of the fourth text node is not greater than a preset proportion.

6. The method according to claim 3, wherein the performing position migration to the comment information according to the change information comprises:
if the text node where the commented text is located remains in the second document, performing position migration to the comment information according to the order of the text node where the commented text is located in its sibling text nodes in the second document, and identity identification of the parent node of the text node where the commented text is located.

7. The method of claim 1, wherein the method further comprises:
sending the changed target document content and comment information after the position migration corresponding to the changed target document content to a client-side.

8. A non-transitory computer-readable medium having computer programs stored thereon, which, when executed by a processing apparatus, implement the steps of the method according to claim 6.

9. An electronic device, comprises:
a storage apparatus having computer programs stored thereon;
a processing apparatus configured to execute the computer programs in the storage apparatus to implement the steps of the method according to claim 1.

* * * * *